US006883660B2

(12) United States Patent
Bigelow et al.

(10) Patent No.: US 6,883,660 B2
(45) Date of Patent: Apr. 26, 2005

(54) CONVEYOR BED EMERGENCY STOP

(75) Inventors: Daniel R. Bigelow, Grand Rapids, MI (US); Wynn M. Pelak, Rockford, MI (US); James A. Griffin, Howard City, MI (US); Artemio Affaticati, Cadeo (IT)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 42 days.

(21) Appl. No.: 10/764,933

(22) Filed: Jan. 26, 2004

(65) Prior Publication Data

US 2004/0182683 A1 Sep. 23, 2004

Related U.S. Application Data

(60) Provisional application No. 60/442,311, filed on Jan. 24, 2003.

(51) Int. Cl.[7] .............................................. B65G 13/06
(52) U.S. Cl. .......................... 198/781.06; 198/781.09; 198/783
(58) Field of Search ................... 198/781.06, 781.09, 198/781.1, 790, 783

(56) References Cited

U.S. PATENT DOCUMENTS

| | | | | |
|---|---|---|---|---|
| 4,461,382 A | * | 7/1984 | Hoover et al. | 198/781.06 |
| 4,715,491 A | | 12/1987 | Elderton | 198/856 |
| 5,186,308 A | | 2/1993 | Munro | 198/572 |
| 5,318,167 A | * | 6/1994 | Bronson et al. | 198/781.06 |
| 5,582,286 A | * | 12/1996 | Kalm et al. | 198/781.06 |
| 5,862,907 A | * | 1/1999 | Taylor | 198/781.05 |
| 6,253,909 B1 | * | 7/2001 | Kalm et al. | 198/781.06 |
| 6,460,683 B1 | * | 10/2002 | Pfeiffer | 198/781.06 |
| 2002/0010527 A1 | | 1/2002 | Majcher et al. | |

FOREIGN PATENT DOCUMENTS

| | | |
|---|---|---|
| EP | 0619247 | 10/1994 |
| EP | 0869089 | 10/1998 |

OTHER PUBLICATIONS

U.S. Appl. No. 02/010,527 A1, filed Jan. 2002, Majcher et al.
Commonly assigned U.S. Appl. No. 10/764,962, filed Jan. 26, 2004, entitled Integrated Conveyor Bed (SIE04 P-106A).
International Search Report dated Jul. 6, 2004, from corresponding International Application No. PCT/US2004/002054.

* cited by examiner

Primary Examiner—James R. Bidwell
(74) Attorney, Agent, or Firm—Van Dyke, Gardner, Linn & Burkhart, LLP

(57) ABSTRACT

A conveyor system includes a conveyor frame, at least one motor at the frame and a control circuit at the frame. The motor is configured to cause articles placed in at least one location on the conveyor system to be transported when the motor is energized. A first power source is housed within the frame and in electrical communication with the at least one motor. The first power source supplies power to the at least one motor. A second power source is also housed within the frame and in electrical communication with the control circuit. The second power source supplies power to the control circuit. The second power source is electrically isolated from the first power source such that electrical current from the first power source can be shut off without shutting off electrical current from the second power source.

29 Claims, 12 Drawing Sheets

US 6,883,660 B2

CONVEYOR BED EMERGENCY STOP

CROSS REFERENCE TO RELATED APPLICATION

This application claims priority from U.S. provisional patent application Ser. No. 60/442,311, filed on Jan. 24, 2003, the disclosure of which is hereby incorporated herein by reference in its entirety.

BACKGROUND OF THE INVENTION

The present invention relates generally to conveyors, and more particularly to the control, installation, and operation of conveying systems.

Conveyor systems are used in a wide variety of material handling applications. These includes such things as conveying luggage throughout airports, conveying parcels through transportation terminals, conveying manufactured parts or components throughout factories, conveying inventory, sorting and conveying items to be transported, and various other applications. Such conveying systems may use conveyors having endless belts that are rotated around end rollers to cause the top surface of the belt to move in the direction of conveyance. Such conveying systems alternatively may use conveyors having a series of rollers, selected ones of which are driven to cause articles positioned on the rollers to move in the direction of conveyance. An example of one such roller conveyor is disclosed in U.S. Pat. No. 6,253,909 issued to Kalm et al, entitled MODULAR POWER ROLLER CONVEYOR, the disclosure of which is hereby incorporated herein by reference. Still other types of conveyors may use movable slats to transport articles, as well as other structures.

Prior conveying systems typically include emergency buttons or other types of switches positioned about the area in which the conveyors of the system operate. The buttons are often referred to as emergency stop buttons, or E-stops for short. These buttons can be pressed in an emergency to shut off power to the conveyors so that they come to a rapid halt. After one of these buttons has been pressed, there is often a certain amount of time and work that must be expended to re-start the system, particularly where a computer-based control is used to control all or a portion of the conveyor system. The termination of the power to the conveyor system may cause the system to lose track of the position of articles on the conveyors. In such situations, re-starting the system may require that at least some articles have to be taken off of the conveyors and re-initiated into the system. In those situations in which power is maintained to the controls after an E-stop has been activated, the wiring of the E-stop switch has often involved separate wires running outside of the conveyor beds. These wires must be properly protected from damage by personnel or machines within the environment, and the installation and protection of these wires often adds time and expense to the conveying system installation, which are desirably reduced or eliminated.

Further time-consuming tasks involved with installing prior conveying systems include the tasks necessary to supply power to all of the conveyor sections in the conveying system. Past conveying systems have often required a relatively large number of power distribution panels that electrically connect to the conveyor beds to provide power. The installation of many power panels, as well as the installation and connection of the various cables and wires that connect these to the conveyor beds themselves, is a task that is desirably simplified.

SUMMARY OF THE INVENTION

According to an aspect of the present invention, a conveyor system includes a conveyor frame, at least one motor at the frame and a control circuit at the frame. The motor is configured to cause articles placed in at least one location on the conveyor system to be transported when the motor is energized. A first power source is housed within the frame and in electrical communication with the at least one motor. The first power source supplies power to the at least one motor. A second power source is also housed within the frame and in electrical communication with the control circuit. The second power source supplies power to the control circuit. The second power source is electrically isolated from the first power source such that electrical current from the first power source can be shut off without shutting off electrical current from the second power source.

According to another aspect of the invention, a conveyor system includes a conveyor frame supporting a conveying surface and at least one motor at the frame. The motor is configured to cause articles placed in at least one location on the conveying surface to be transported when the motor is energized. First and second power lines are housed within the frame. A first power supply supported by the frame and in electrical communication with the first power line is adapted to supply electrical current at a first voltage to the at least one motor. A motor controller supported by the frame is adapted to control the at least one motor. A second power supply supported by the frame and in electrical communication with the second power cable is adapted to supply electrical current at a second voltage level to the motor controller. A power interface positioned adjacent a first end of the frame is in electrical communication with the first and second power lines and is adapted to allow power to be supplied to an adjacent conveyor.

These and other objects, advantages, and features of this invention will become apparent upon review of the following specification in conjunction with the drawings.

DETAILED DESCRIPTION OF THE INVENTION

Figure 1:
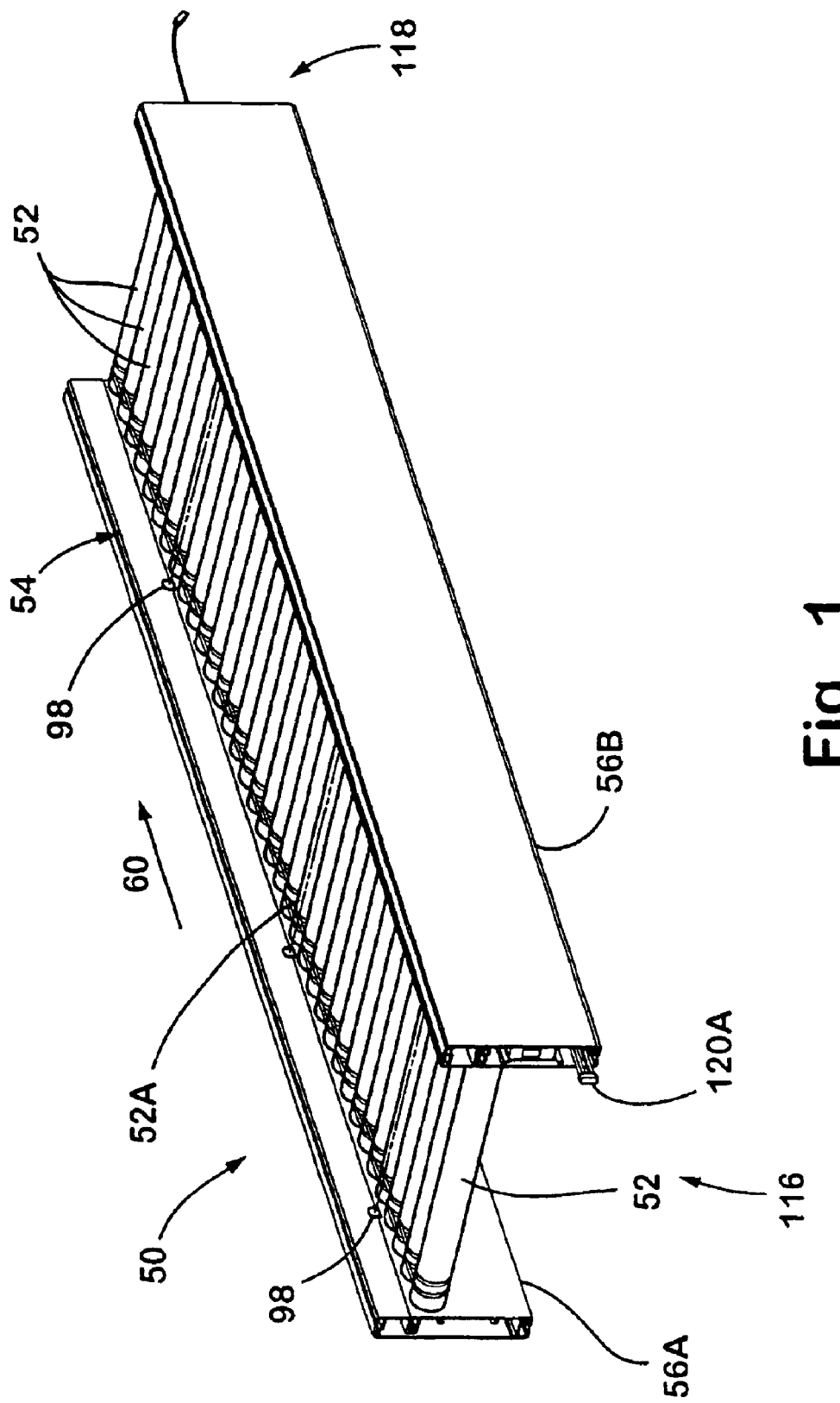
FIG. 1 is a perspective view of a conveyor bed according to one aspect of the present invention.

The present invention will now be described with reference to the accompanying drawings wherein the reference numerals in the following written description correspond to like-numbered elements in the several drawings. A conveyor bed 50 according to one aspect of the present invention is depicted in FIG. 1. Conveyor bed 50 may be a modular unit that may be used as part of a conveying system made up of additional modular conveying units, or a conveying system made up solely of a single conveyor bed. Conveyor bed 50 includes a conveying surface which may be driven by a plurality of rollers 52 that are supported on each of their ends by a frame 54 and driven either through O-rings from a drive, such as a motorized roller, or through an endless member, such as disclosed in commonly assigned application Ser. No. 10/411,924, filed Apr. 11, 2003, entitled TAPE DRIVE CONVEYOR, which is incorporated herein by reference. Frame 54 includes first and second side members 56a and b. Side members 56a and b generally extend the length of conveyor bed 50 in a parallel orientation. The top surfaces of rollers 52 in the illustrated embodiment define a conveying surface 58 on which articles, such as packages, boxes, cartons, or other types, may be placed. The conveying surface may also be defined by belts or the like as disclosed in commonly assigned application Ser. No. 10/358,690, filed Feb. 5, 2003, entitled BELT CONVEYOR the disclosure of which is hereby incorporated by reference. One of more of rollers 52 are powered. In operation, the rotation of the powered rollers causes articles placed on conveying surface 58 to move longitudinally along the length of conveyor bed generally in a direction of conveyance 60.

As will be described in more detail herein, conveyor bed 50 is constructed in a generally modular fashion. The modular nature of conveyor bed 50 includes both the physical construction of conveyor bed 50, as well as the control components and functions that may be used with conveyor bed 50. In addition to the modular nature of conveyor bed 50, it includes high voltage electrical power lines such as insulated cables, bus ducts, or the like that simplify the installation of conveyor systems, as well as the use of high powered conveyor components, such as motors and the like. Conveyor bed 50 may further include a number of control components that are specially designed to be easily installed, removed, serviced, and otherwise used in conjunction with conveyor bed 50, as well as different variations of conveyor beds.

Figure 2:
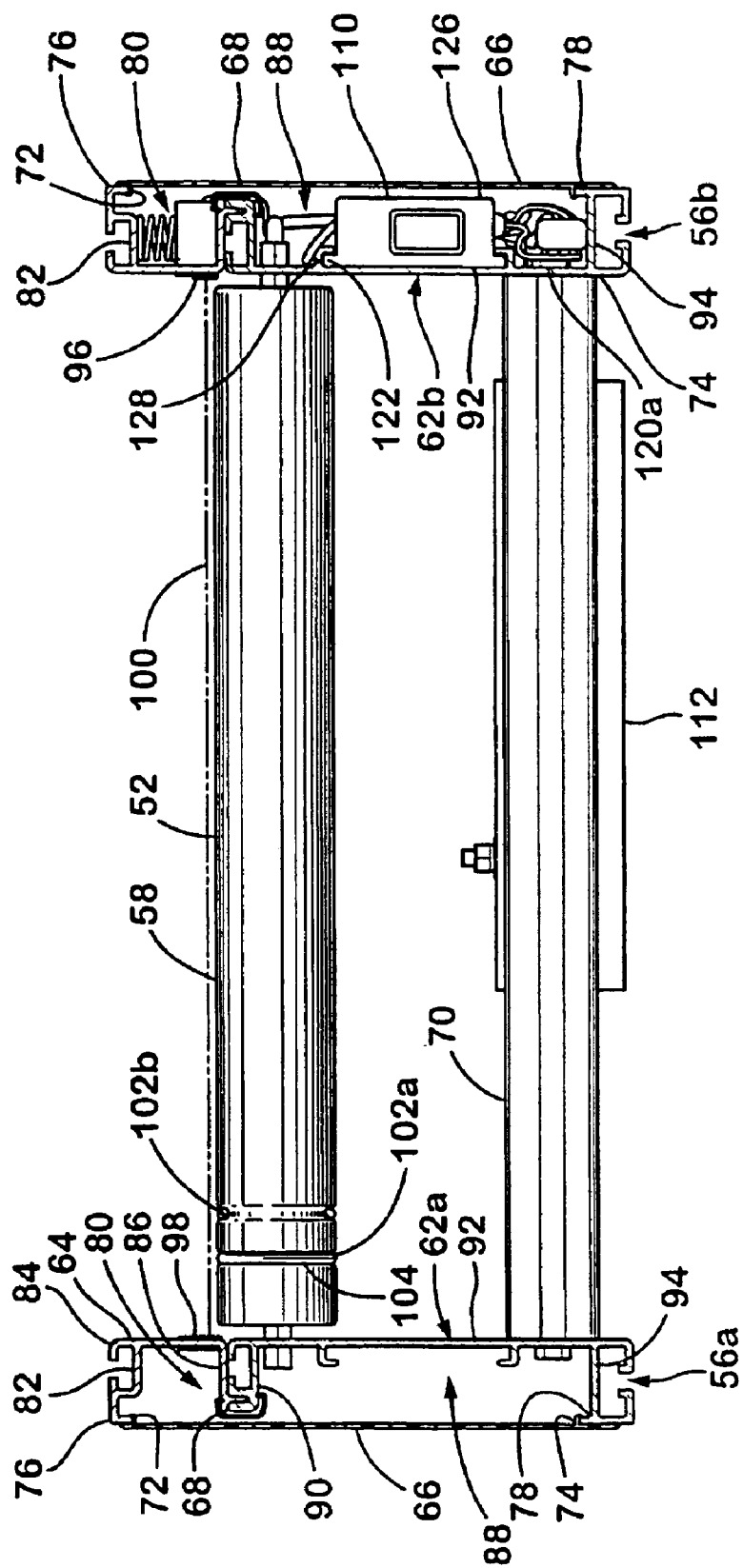
FIG. 2 is a front, elevational view of the conveyor bed of FIG. 1.

A more detailed construction of side member 56a and b is depicted in FIG. 2. As illustrated, each side member 56 includes a lower member 62, an upper member 64, a cover 66, and a C-clamp 68. Upper and lower members 64 and 62 generally extend for the length of conveyor bed 50. Upper and lower members 64 and 62 may be made of any suitable material. For example, members 64 and 62 may be extruded aluminum with an anodized finish. Other constructions and materials of course can also be used. Right and left lower member 62a and b are connected to each other by a cross member 70 that extends underneath rollers 52 in a direction generally transverse to the direction of conveyance 60. Lower members 62a and b are rigidly secured to cross member 70 by way of bolts, or any other suitable fastener. Upper member 64a and b are releasably secured to lower member 62a and b, respectively, by way of C-clamps 68. C-clamps 68 are made of a flexible material that snap fittingly fits over a shoulder defined in upper member 64. By suitably flexing C-clamp 68, it can be removed from upper and lower members 64 and 62. Once so removed, upper member 64 can be freely removed off of the top of lower member 62. The removal of upper member 64 allows for differently dimensioned upper member 64 to be easily used on conveyor bed 50.

Cover 66 is selectively positionable along the outer side of upper and lower members 64 and 62. Cover 66 includes an upper flexible tab 72 and a lower flexible tab 74. Flexible tabs 72 and 74 are positioned on a side of cover 66 that is not visible to outside personnel when cover 66 is attached to side members 56a and b. Upper and lower flexible tabs 72 and 74 selectively secure cover 66 to upper and lower member 64 and 62. Upper flexible tab 72 flexibly fits over a vertical outer flange 76 of upper member 64. Lower flexible tab 74 flexibly fits over a vertical, outer flange 78 defined on lower member 62. Cover 66 can be removed from upper and lower members 64 and 62 by either sliding cover 66 along members 64 and 62 in a direction generally parallel to the direction of conveyance 60, or by pulling cover 66 outwardly until cover 66 sufficiently flexes to allow flexible tabs 72 and 74 to disengage from flanges 76 and 78.

When cover 66 is attached to upper and lower member 64 and 62, two separate cavities are generally defined. An upper cavity 80 is generally defined by cover 66, a top wall 82 of upper member 64, a sidewall 84 of upper member 64, and a bottom wall 86 of upper member 64. A lower cavity 88 is generally defined by cover 66, a top wall 90 of lower member 62, a sidewall 92 of lower member 62, and a bottom wall 94 of lower member 62. Upper and lower cavities 80 and 88 extend generally along the entire length of conveyor bed 50 in a direction parallel to the direction of conveyance 60. Upper cavity 80 provides a housing for one or more photo-sensors 96 and photo reflectors 98 that may be included in conveyor bed 50. Lower cavity 88 proves a housing for a number of control components as well as various cabling, as will be described in more detail herein.

Figure 3:
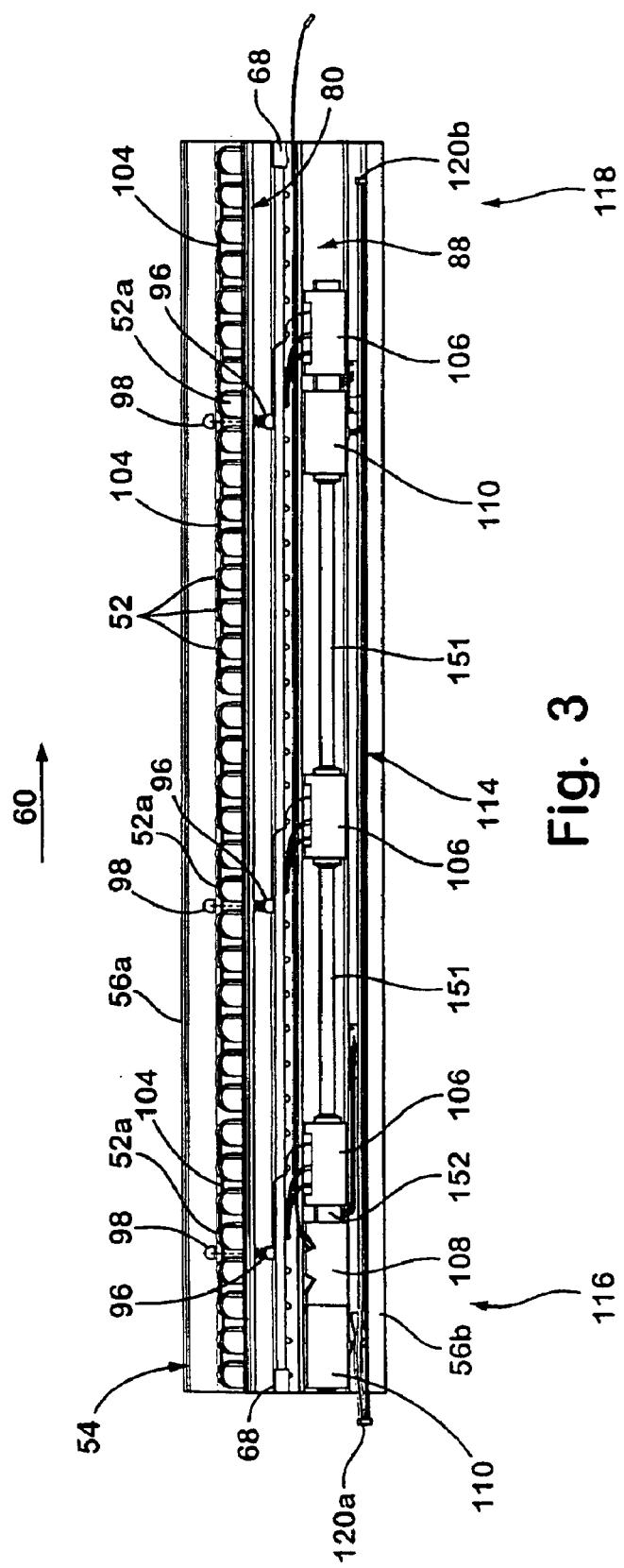
FIG. 3 is a side, elevational view of the conveyor of FIG. 1 illustrated with a side panel removed to show the underlying components.

As illustrated in FIG. 2, sensors 96 emit a beam of light 100, or other electromagnetic energy across conveyor bed 50 at a height slightly above conveying surface 58. This height may be about 5 millimeters, although other heights may be used. Light beam 100 is emitted from sensor 96 such that it impinges reflector 98, and is thereby reflected back to sensor 96. Sensor 96 include photoreceptors that detect the reflected light beam 100. When an article is traveling on conveying surface 58 adjacent photosensor 96, the article will interrupt light beam 100, thereby allowing photosensor 96 to detect the presence of an article. Photosensors 96 and reflectors 98 may be any conventional, commercially available sensors and reflectors. The number of sensors 96 and reflectors 98 in a given conveyor bed 50 can be varied, depending on the particular design and/or application to which a conveyor bed 50 will be used. A spring 97 may be positioned above photosensor 96 to help maintain photosensor 96 in its proper position. Alternatively, separate photo emitters and photo receptors can be used on opposite sides of the conveyor bed. As illustrated in FIG. 3, conveyor bed 50 includes 3 photosensors 96 and three reflectors 98.

As mentioned previously, several of the rollers 52 are motorized rollers. These motorized rollers are designated by the reference number 52a. Motorized rollers 52a are preferably, although not necessarily, constructed to contain all of the motor components within the roller itself. Examples of these types of motorized rollers are disclosed in U.S. Pat. No. 5,088,596 issued to Agnoff and U.S. Pat. No. 4,121,127 issued to Adelski et al., the disclosures of which are both hereby incorporated herein by reference. Regardless of which type of motorized roller is used in the present invention, the motorized roller may advantageously be a 48 volt motorized roller. 48 volt-motorized rollers provide more power than conventional 24-volt motorized rollers that have been often used in the past. The motorized roller may include a gear type speed reducer or may be a direct drive type of motor. In the illustrative embodiment, motorized rollers 52a are 48-volt, direct drive motorized rollers of the type disclosed in commonly assigned German patent application Serial No. 10324664.9 filed May 30, 2003, entitled ROLLERS AND ROLLER MOTORS, the disclosure of which is hereby incorporated herein by reference.

Figure 4:
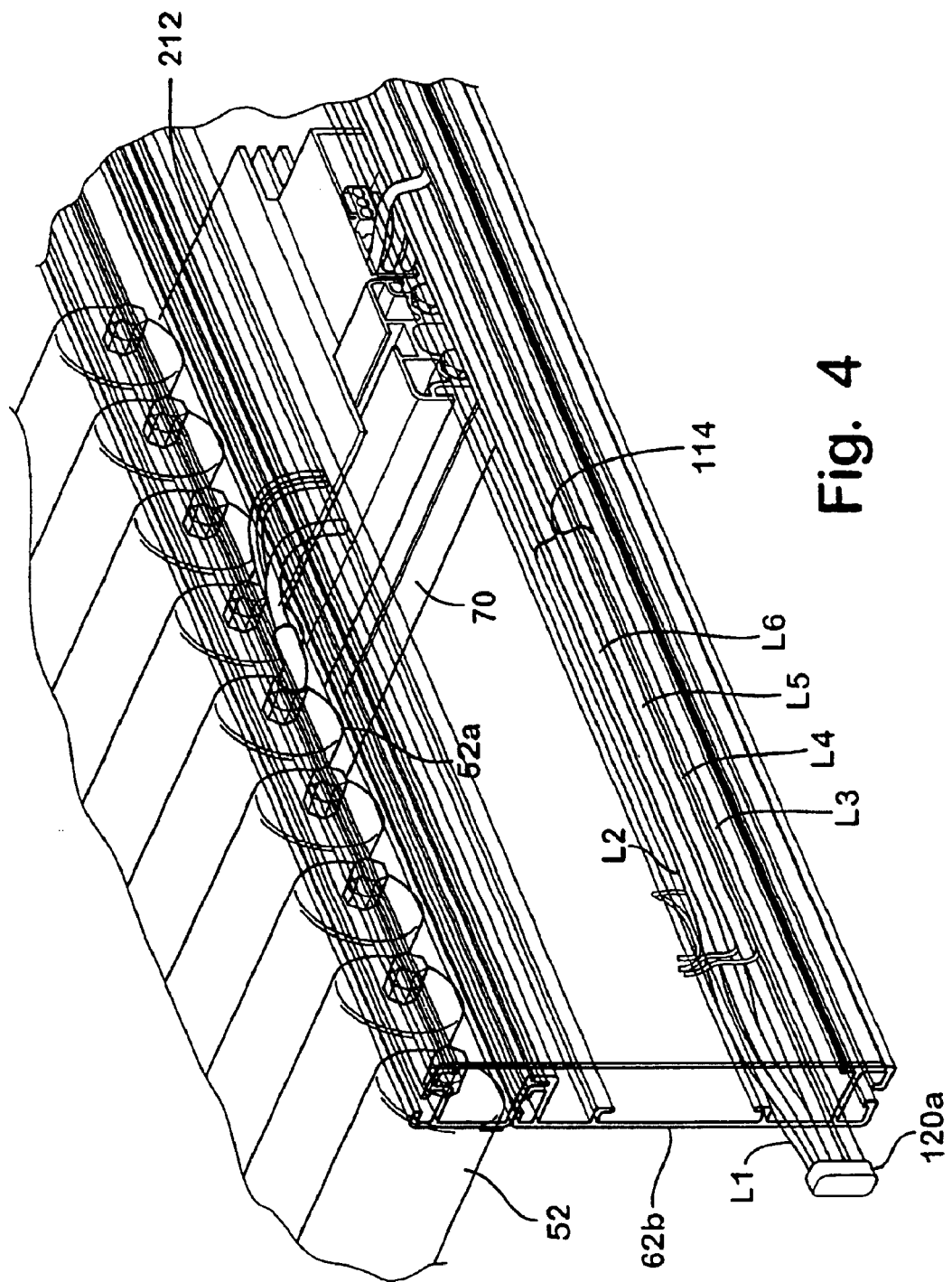
FIG. 4 is a close up, perspective view of a transformer, electrical wiring, and other aspects of the conveyor bed of FIG. 1.

Each conveyor bed 50 includes a control system, or circuit, made up of a plurality of control elements and electrical power components. Some of these elements are illustrated in FIG. 3. Each motorized roller 52a is controlled by a motor controller 106. Each bed 50, or set of conveyor beds 50, includes at least one programmable bed, or functional, controller 108. Bed controller 108 sends commands to each of the motor controllers 106 that dictate how motor controllers 106 will control the operation of motorized rollers 52a. Motor controllers 106 may be variable frequency drives, or other types of motor drivers. Motor controllers 106 and bed controller 108 receive electrical power from a low voltage power supply 110. Low voltage power supply 10 is a transformer rectifier that transforms alternating current into direct current, as well as dropping the voltage level of the direct current to a lower level than the voltage of the AC current. The value of the voltage of the direct current output by low voltage power supply 110 may be 24 volts, although other voltages may, of course, be used within the scope of the present invention. Low voltage power supply 110 also supplies electrical power to photosensors 96. Low voltage power supply 110 does not supply power to motorized rollers 52a. Instead, motorized rollers 52a receive their electrical power from a high voltage power supply 112 (FIGS. 2 and 4). High voltage power supply 112 is also a transformer rectifier that transforms AC current to DC current, and drops the voltage of the AC current to a lower level. High voltage power supply 112 may output direct current having a voltage of 48 volts, although other voltages may also be used within the scope of the present invention. The relatively high 48-volt direct current that is used to power motorized rollers 52a allows motorized rollers 52a to be designed to operate with more power. In the given application, fewer motorized rollers 52a would therefore have to be used for a given length of conveyors than if lower voltage motorized rollers were used, such as 24-volt motorized rollers. The use of higher voltage motorized rollers 52a thereby helps to reduce the costs of a given conveying system by utilizing fewer motorized rollers 52a.

Figure 5:
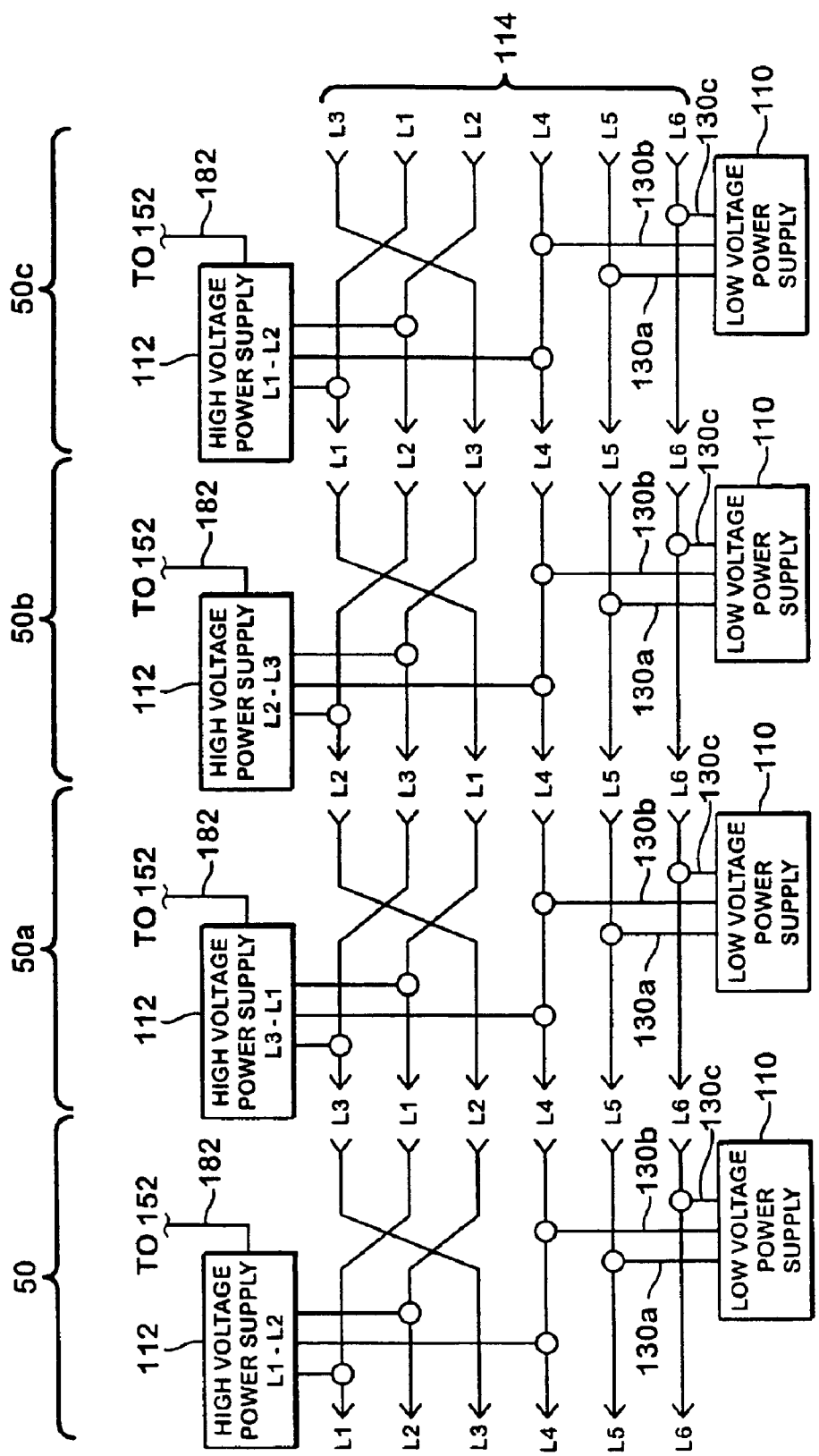
FIG. 5 is an electrical schematic of the arrangement of power supply lines for four adjacent conveyor beds.
Figure 6:
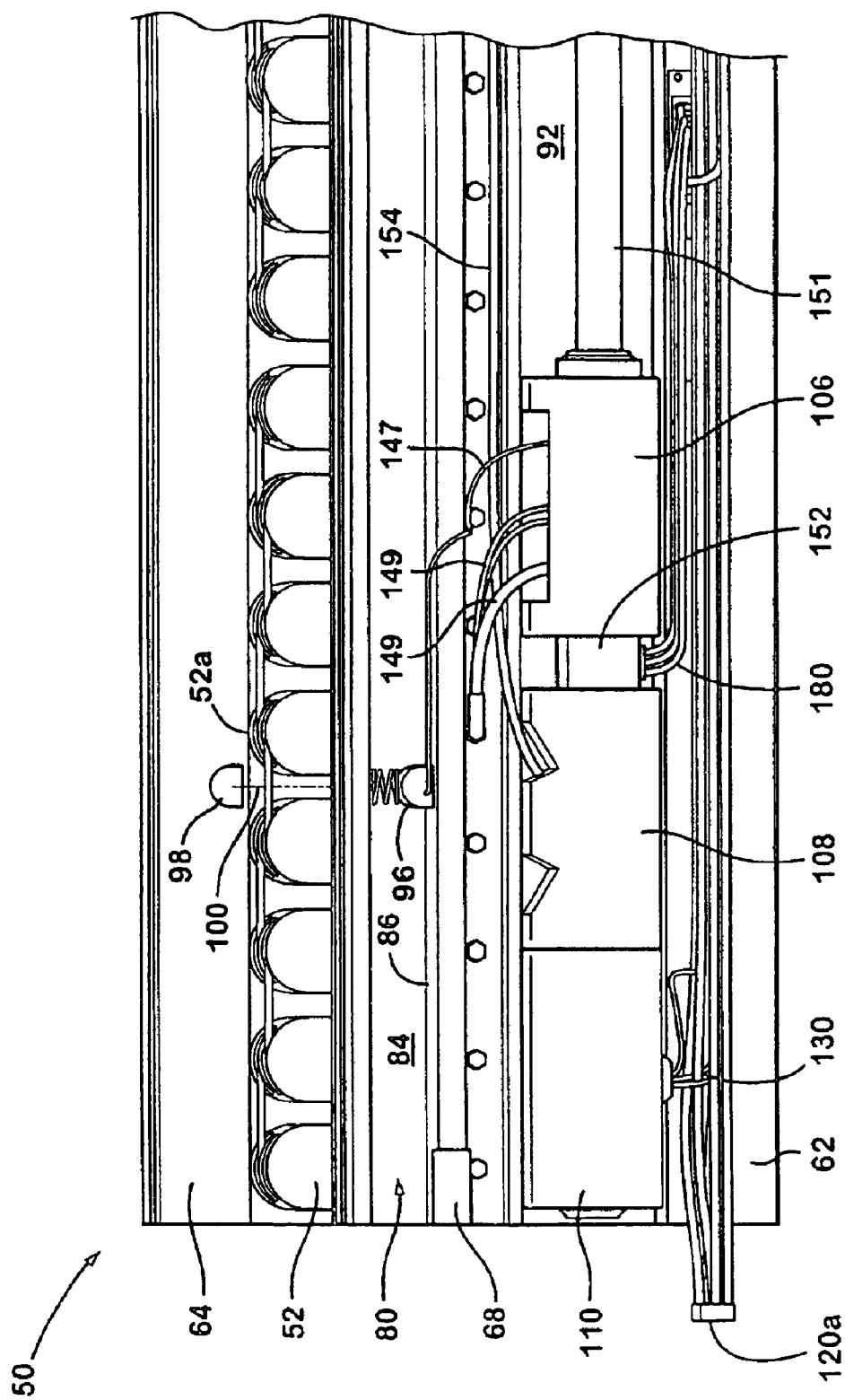
FIG. 6 is a side, perspective view of various electrical and electronic components of the conveyor bed of FIG. 1.

Each conveyor bed 50 includes an AC wire harness 114 that extends generally along the entire length of conveyor bed 50 (FIGS. 3–5). AC wire harness 114 may be housed within lower cavity 88 of side member 56b. In the illustrated embodiments, AC wire harness 114 consists of 6 individual lines, or wires, L1–L6 (FIGS. 4 and 6). Lines L1, L2, and L3 carry three-phase, alternating current and supply electrical power to high voltage power supplies 112. The current in these wires may have a voltage of 264 volts or greater, although lesser voltages may also be used. Line L4 is an electrical ground wire that is operably connected to both low voltage power supply 110 and high voltage power supply 112. Line L5 is a wire that carries alternating current at any voltage that may be suitable for the conveyor application. Line L5 supplies power to low voltage power supplies 110. Line L6 is a neutral wire that is also electrically coupled to low voltage power supplies 110. Lines L1–L6 may all be 10 AWG electrical wires, although other size wires may be used within the scope of the present invention.

As mentioned previously, the wires in wire harness 114 generally extend for the entire length of conveyor 50. Lines L1–L6 generally terminate near a front end 116 and a back end 118 of conveyor bed 50. Lines L1–L6 terminate near front end 116 in a power connector 120a (FIG. 4). Lines L1–L6 terminate near back end 118 in a power connector 120b (FIG. 3). Power connectors 120 are constructed to operably connect lines L1–L6 to corresponding lines L1–L6 in an adjacent conveyor bed 50. Accordingly, power connectors 120a and b can take on any suitable form for electrically connecting the wires and harness 114 of one conveyor bed to another conveyor bed. Accordingly, one of the power connectors 120a and b may be a conventional, female type connector that provides a mating connection to a conventional, male connector positioned on an adjacent conveyor. The other power connector 120a or b may be a male connector for connection to a female power connector associated with an adjacent conveyor bed 50 located at the opposite end of conveyor bed 50. AC wire harness 114 therefore can be serially connected to adjacent conveyor beds by way of power connectors 120 to thereby provide AC power to the various components in each of the conveyor beds 50. AC wire harness 114 may extend for as long as 100 meters of conveyor length before one of its ends must be connected to a local power supply in the factory, or other environment in which the conveyor system is installed.

The connections of AC wire harness 114 to four consecutive conveyor beds 50–50c is depicted in FIG. 5. As can be seen, each high voltage power supply 112 is connected to two of the three phase lines L1–L3. Each high voltage power supply 112 is also connected to the ground wire L4. The phases of the power supplied to high voltage power supplies 112 are rotated for each conveyor bed 50 so that the power supplied is balanced as more conveyor beds are added. For example, high voltage power supply 112 in conveyor bed 50 is coupled to lines L1 and L2. High voltage power supply 112 in bed 50a is coupled to lines L3 and L1. High voltage power supply 112 in conveyor bed 50b is coupled to lines L2 and L3. This alternation of two of the three lines L1–L3 continues for each conveyor bed 50 that is added to the chain of conveyor beds. Low voltage power supplies 110 all receive their power from line L5. Although illustrated as a single-phase AC line, line L5 is preferably a 3-phase AC line, such as at 240 volts nominal, provided with non-interruptible current. Low voltage supplies 110 are balance on all three phases of line L5 in a similar manner to the high voltage power supplies being balanced across lines L1–L3. As will be discussed in more detail below, low voltage power supplies 110 provide power to a control circuit made up of various control components or elements on conveyor bed 50. High voltage power supplies 112 provide electrical power to the motors on the conveyor beds. By connecting power supplies 110 and 112 to two different sets of lines, it is possible to shut down the motion of the conveying system without losing the information stored in, and sensed by, the control components. Such a shut down may occur during an emergency stop of the conveying system.

FIG. 6 depicts a plurality of different control elements that may be present in a conveyor bed 50. These include bed controller 108, motor controller 106, photosensors 96 and reflectors 98, and low voltage power supply 110. Bed controller 108, low voltage power supply 110, and motor controller 106 are all housed within plastic casings 138 (FIG. 8) that fit in lower cavity 88 of side members 56. These casings 138 may be made of any suitable materials, such as thermoplastic injection molded plastics like ABS, or other materials. Each of the casings preferably includes an upper tab 122 and a lower tab 124 (FIG. 2). Lower tab 124 fits into a lower hook 126 defined along sidewall 92 of lower member 62. Upper tab 122 fits into an upper hook 128 that is also defined along sidewall 92 of lower member 62. At least one of tabs 122 and 124 is preferably flexible enough to allow the casing to be snap fit into upper and lower hooks 128 and 126. One or both of upper and lower tabs 122 and 124 are also preferably flexible enough to allow the casing to be easily manipulated out of hooks 126 and 128. Hooks 126 and 128 thus allow the casings to be easily inserted into conveyor bed 50, as well as to be easily removed for servicing, replacement, or other purposes. The casings may be slid longitudinally while positioned in hooks 126 and 128 in a direction that is generally parallel to the direction of conveyance. Interconnection and operation of bed controller 108, motor controller 106, photosensors 96 and low voltage power supply 110 is as set forth in detail in the commonly assigned co-pending application entitled INTEGRATED CONVEYOR BED filed concurrently herewith (U.S. Ser. No. 10/764,962), the disclosure of which is hereby incorporated herein by reference.

Figure 7:
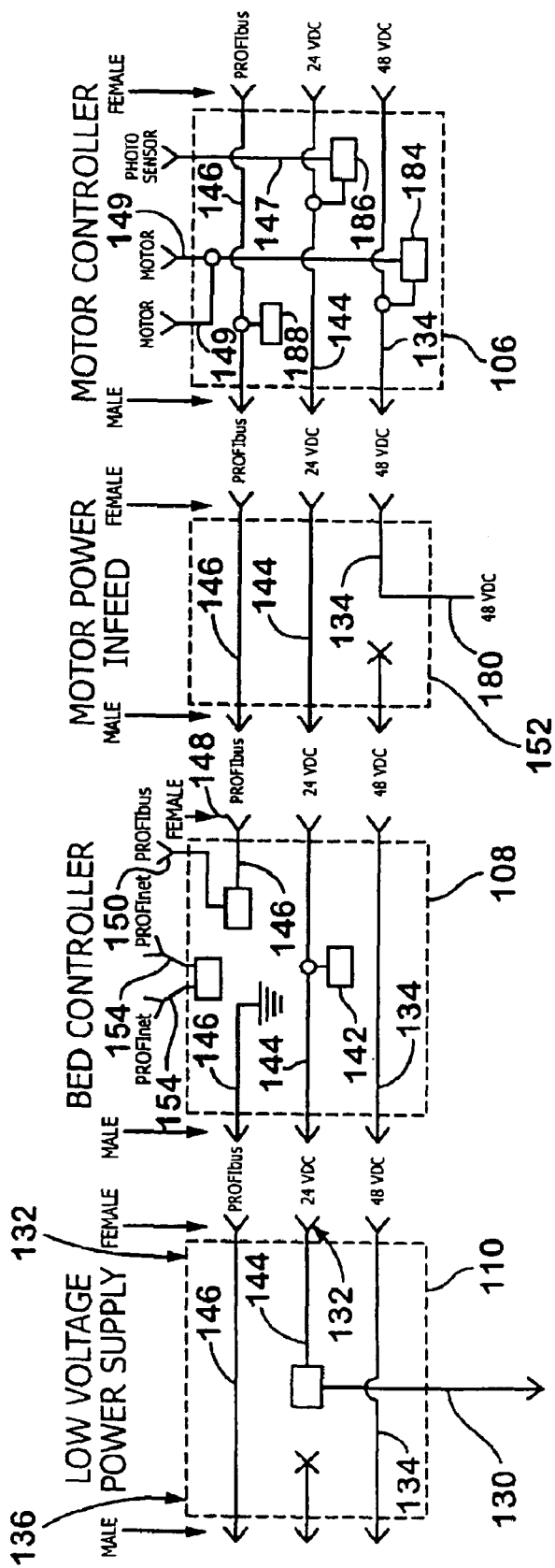
FIG. 7 is a schematic diagram of four of the components depicted in FIG. 6.
Figure 8:
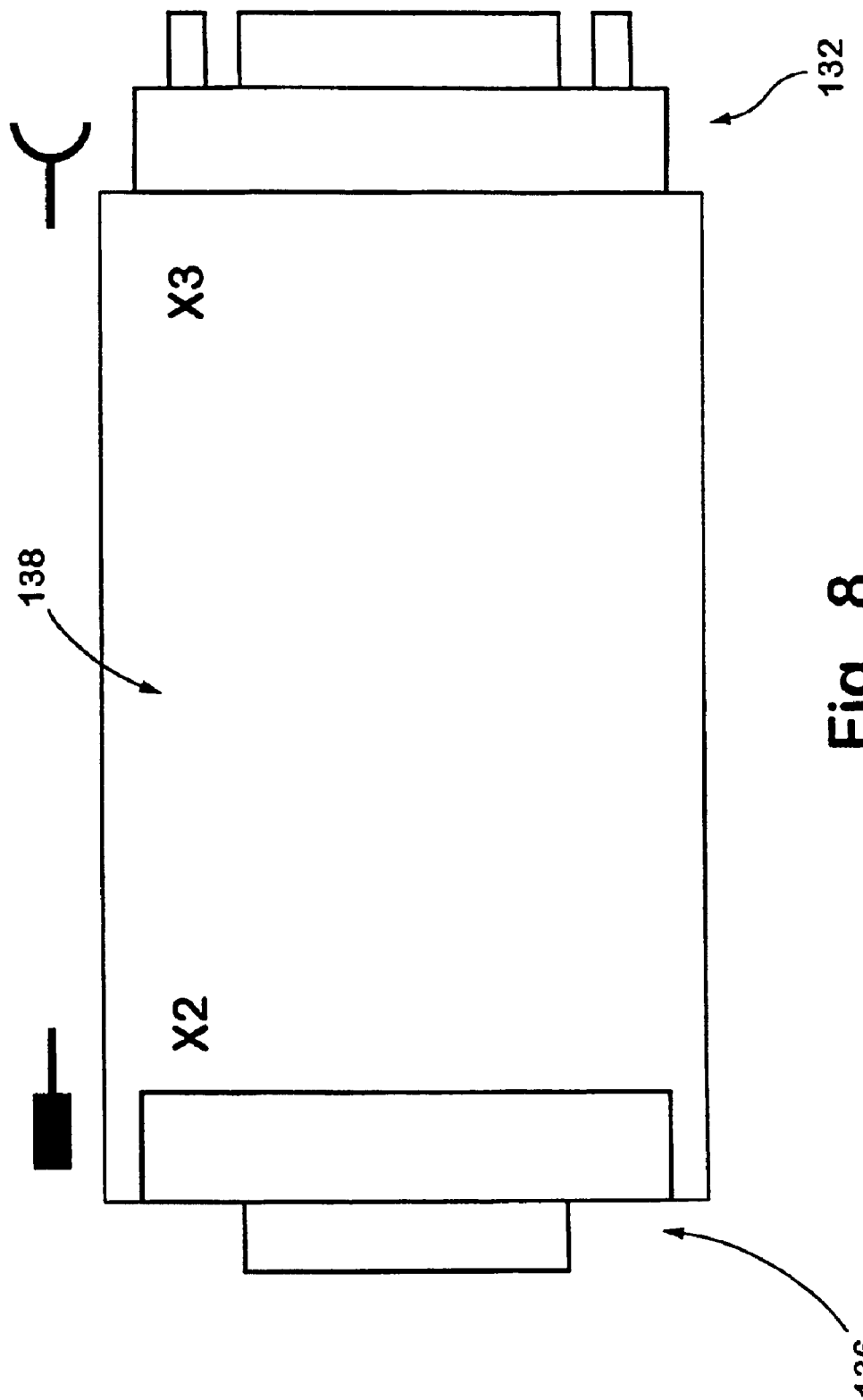
FIG. 8 is a side, elevational view of a casing illustrating its port structures.
Figure 9:
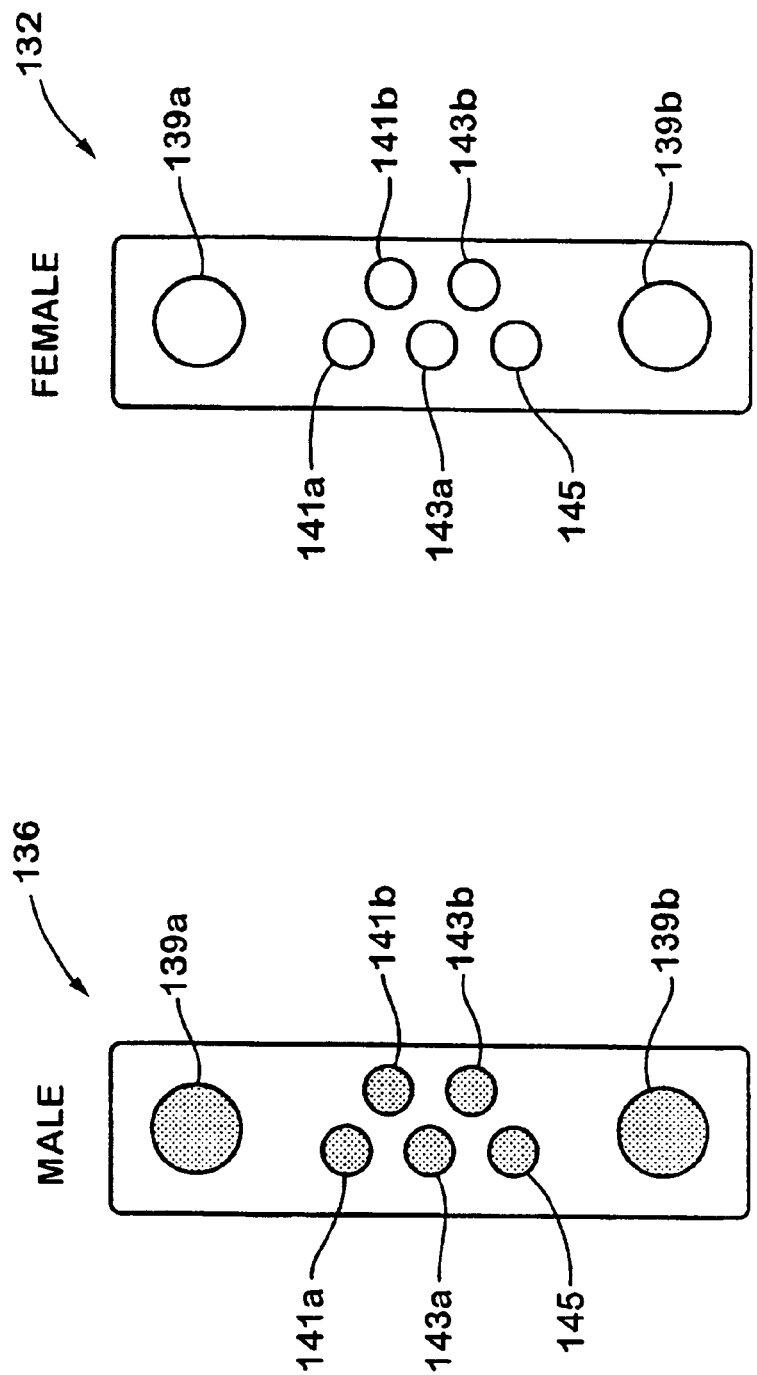
FIG. 9A is a front, elevational view of a male port on the casing of FIG. 8.
FIG. 9B is a back, elevational view of a female port on the casing of FIG. 8.

As illustrated in FIGS. 7–9, each motor controller 106, functional controller 108, and low voltage power supply 110 may include a male port 136 on one side and a female port 132 on the opposite side. These ports may take on any suitable configuration that allows these components to be interconnected in a serial fashion. As illustrated in FIG. 7, these interconnections allow electrical power connections of two different voltages to be made, as well as interconnections with an open network, such as a Profibus field bus, Ethernet bus, or the like. Low voltage power supply 110 receives power from a line 130a that is electrically coupled to wire L5. As has been noted, the electrical current in wire L5 is alternating current. Additional lines 130b and 130c couple power supply 110 to lines L4 and L6, respectively (FIG. 5). Low voltage power supply 110 rectifies this alternating current into direct current. The AC voltage in wire 130 is also transformed to a lower voltage, such as the 24 volts illustrated in FIG. 7. Other voltages may also be used within the scope of the present invention. Low voltage power supply 110 passes the 24-volt direct current to a power line 144 that is coupled to female port 132. By connecting an interlocking male port 136 to female port 132, 24-volt direct current can be supplied to adjacent electrical components. Low voltage power supply further includes a high voltage power line 134. High voltage power line 134 passes electrical current between male and female ports 136 and 132 of power supply 110. Low voltage power supply 110 does not utilize any of the power in high voltage power line 134. Male and female ports 136 and 132 are positioned at the ends of high voltage power line 134 to allow it to be interconnected with corresponding high voltage lines in adjacent electrical structures. Low voltage power supply 110 may further include a communications bus 146 that extends between male port 136 and female port 132. Bus 146 is composed of one or more wires that are used in a communications bus for communication between bed controller 108 and motor controllers 106. Because low voltage power supply 110 does not communicate with any other structures, bus 146 simply passes through power supply 110 and acts as a conduit for bus 146.

Bed controller 108 includes an electrical tap 142 that taps into power line 144. Power line 144 is in electrical communication with the rectified and transformed voltage that is output from low voltage power supply 110. Bed controller 108 includes a female port 132 and a male port 136 that are the same as the ports on power supply 110 and allow interconnection therewith. Power line 144 extends across bed controller 108 from male port 136 to female port 132. The male port 136 of bed controller 108 is interconnected with the female port 132 of power supply 110. Lines 146, 144, and 134 of bed controller 108 are all therefore in electrical communication with the respective lines 146, 144, and 134 in power supply 110. Electrical tap 142 utilizes the electrical power in power line 144 to provide electrical power to the internal components of bed controller 108.

Bed controller 108 provides passage for high voltage power line 134 from one end of controller 108 to another. Power line 134 is electrically connected to the high voltage power line 134 in low voltage power supply 110 (FIG. 7). High voltage power line 134 of bed controller 108 simply passes the high voltage current in line 134 from one end of the bed controller to another, and does not draw any power therefrom, or otherwise affect the current in line 134. Bed controller 108's male and female ports also provide interconnections for communications bus 146. Communications bus 146 may be any communications bus, but preferably is a low cost, open communications bus, such as Profibus. Bed controller 108 includes a first communications bus input 148 and a second communications bus input 150. First communications bus input 148 is positioned on bed controller 108 to be operably coupled via female port 132 to an adjacent electrical component, such as a motor power infeed 152, or a motor controller 106. Second communications bus input 150 is provided to receive communications from an external source. For example, when bed controller 108 is to be programmed, the software that is used by bed controller 108 can be transferred to bed controller 108 by a computer temporarily connected to second communications bus input 150.

Motor power infeed 152 is illustrated in FIG. 7 positioned between a bed controller 108 and a motor controller 106. Motor power infeed 152 serves to provide the relatively high voltage power to motor controller 106 that is used to power motorized rollers 52. Communications bus 146 passes through motor power infeed 152 without being utilized or altered by infeed 152. Motor power infeed 152 thus serves only as a conduit for communications bus 146. Likewise, low voltage power line 144 simply passes through motor power infeed 152. Motor power infeed 152 does not utilize or alter the electrical current flowing in power line 144. Motor power infeed 152 includes a power input 180 that is electrically coupled to high voltage power supply 112. Power input 180 is electrically coupled to a high voltage power line 134 that terminates at the female port 132 on motor power infeed 152. The male port 136 for high voltage power line 134 on infeed 152 simply terminates. Thus, as illustrated in FIG. 7, any motor controllers 106 that are positioned to the left of motor power infeed 152 will receive power in high voltage power line 134 from an upstream motor power infeed 152 (not illustrated). Motor controllers 106 that are to the right of power infeed 152 in FIG. 7 will receive power through high voltage line 134 that is supplied by motor power infeed 152. Motor power infeeds 152 are thus provided periodically along the length of conveyor beds 50. One motor power infeed 152 is provided for each high voltage power supply 112.

As illustrated in FIGS. 2 and 4, high voltage power supplies 112 may be physically located underneath rollers 52, rather than in side members 56. The location of high voltage power supplies 112 underneath rollers 52, rather than inside channels 56, may be desirable to provide sufficient physical space for power supplies 112. To the extent power supplies 112 can be constructed to fit within lower cavity 88 of side members 56, the invention contemplates positioning them there, or in any other suitable position. When positioned as illustrated in FIGS. 2 and 4, cross-member 70 may be in contact with high voltage power supply 112 and serves as a heat sink for power supply 112. Depending on the number of motorized rollers 52a in a given conveyor bed 50, it may be necessary, or desirable to include more than one high voltage power supply 112 on a given conveyor bed 50. Alternatively, in some cases, conveyor bed 50 may have so few motorized rollers 52a that these motorized rollers can receive power from a high voltage power supply 112 positioned on an adjacent or other conveyor bed. High voltage power supplies 112 each include a power output cable 182 that is electrically coupled to power inputs 180 in motor infeeds 152. Power output cable 182 may be comprised of three individual wires that include a ground, a positive high voltage, and a negative high voltage. For the embodiment depicted in FIG. 7, power output cable 182 would include a ground wire, a plus 48-volt wire, and a minus 48-volt wire.

One embodiment of male and female ports 136 and 132 that may be used on power supply 110, controllers 106 and 108, and power infeeds 152 is depicted in FIGS. 8, 9A, and 9B. Casing 138 of FIG. 8 represents a casing that may be used to house power supply 110, controller 106, or controller 108. One male port 136 is attached to the right end of casing 138 and one female port 132 is attached to the left end of casing 138. The male port 136 includes a number of pins that fit into corresponding receptacles in an interconnected female port. Pins 139a and b correspond to +48 volts and ground, respectively. These pins provide the interconnections for high voltage power line 134. Pins 141a and b provide +24 volts and −24 volts, respectively. Together with the common ground of pin 139b, these pins interconnect low voltage power line 144 between components in adjacent casings 138. Pins 143a and b provide positive and negative wires, respectively, for the communications bus 146. Pin 145 provides a connection for a self-addressing wire 190, that will be described in more detail herein. While FIG. 9B includes the same reference numerals as FIG. 9A, it will be understood that the physical construction of female port 132 does not actually include pins, but rather receptacles dimensioned to receive the physical pins on male port 136.

Figure 10:
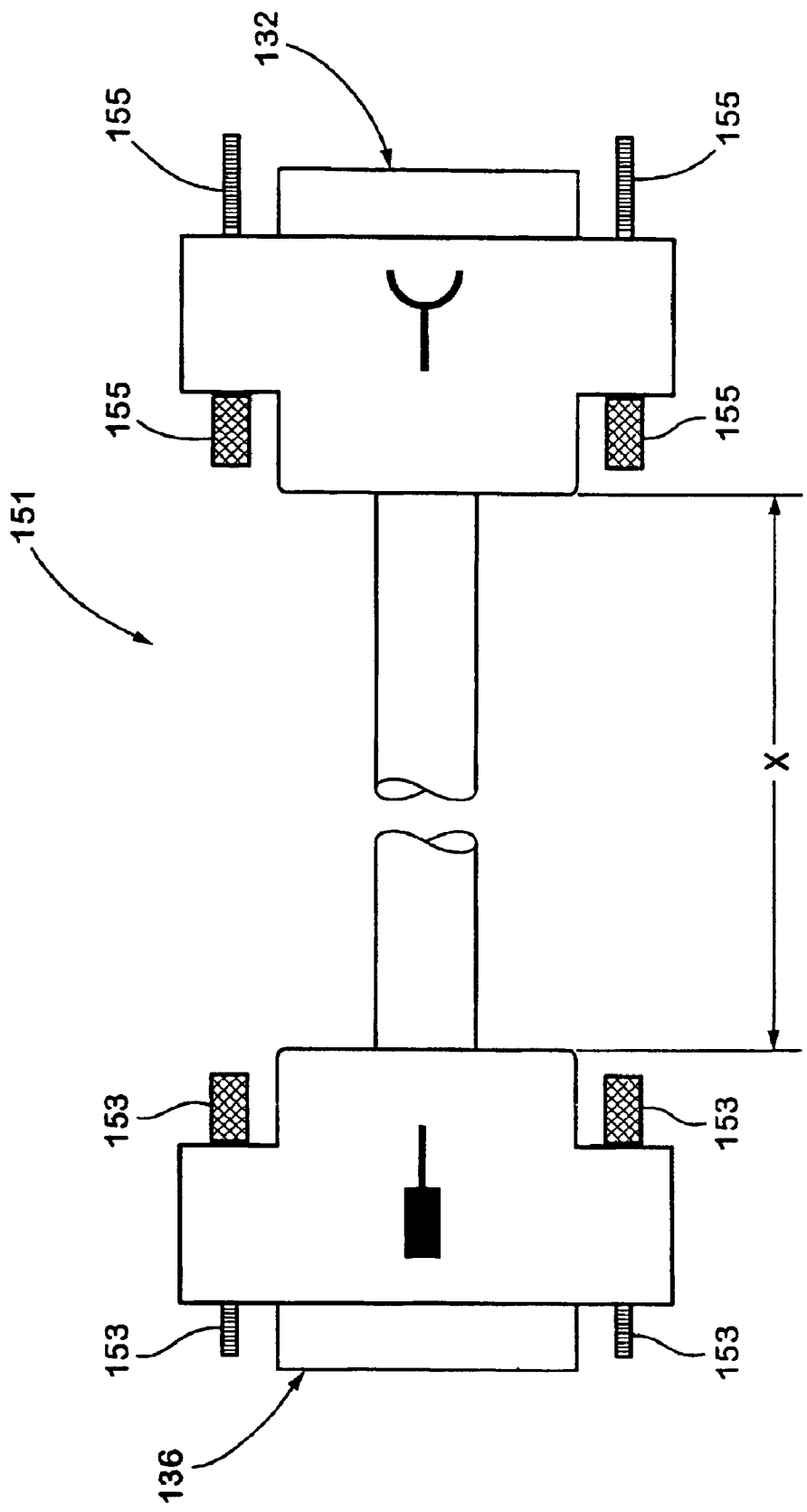
FIG. 10 is a side, elevational view of wire harness.
Figure 11:
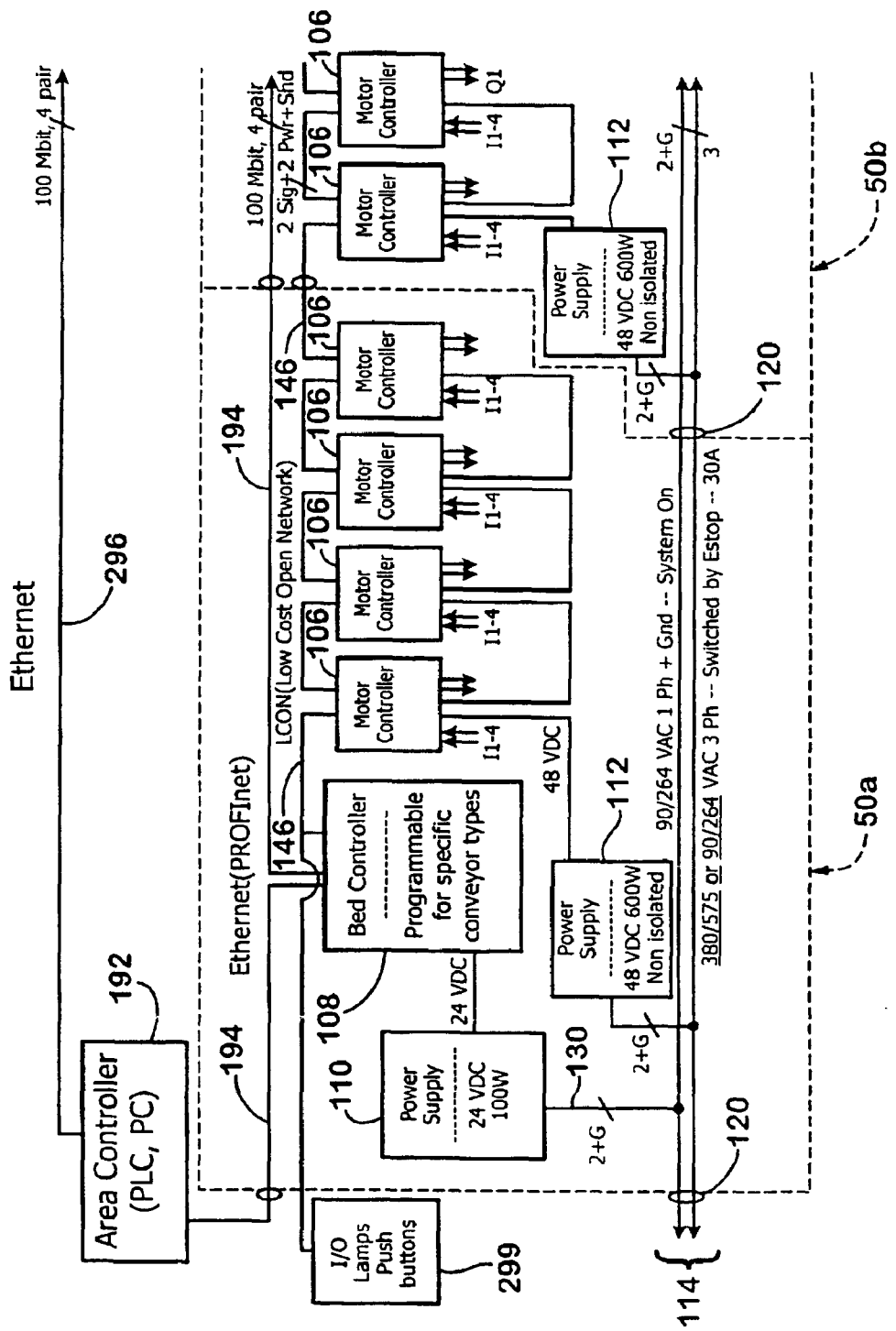
FIG. 11 is a diagram of various control components of a conveyor bed and an adjacent conveyor bed according to one aspect of the present invention.

If two components housed within two casings 138 are positioned adjacent to each other, their corresponding male and female ports may simply be interconnected directly. However, if the two components are physically separated, such as the two interconnected motor controllers 106 of FIG. 3, a wire harness 151 may be used to connect together the components. An example of one type of wire harness 151 that may be used is depicted in FIG. 10. Wire harness 151 includes a male port 136 and a female port 132 that have the same physical configuration, and same pin/receptacle layout, as has been described with respect to casings 138. Male port 136 may also include a pair of short screws 153 that are received in corresponding screw holes of whatever casing 138 male port 136 is to be connected to. Screws 153 thus secure male port 136 of harness 151 to the attached casing. Female port 132 may also include a pair of larger screws 153 that are used in a similar manner to secure female port 132 to the attached casing 138. Harness 151 carries communications bus 146, low voltage power line 144, and high voltage power line 134 between its two ports 132 and 136. The length X of harness 151 can be selected to suit the given conveyor bed in which it is to be positioned.

Motor controller 106 is used to control the motors of motorized rollers 52a. These motors may be either brushless motors or non-brushless motors. Motor controllers 106 control the operation of their associated motorized rollers 52a based upon how they have been programmed and the commands they received from a bed controller 108 that are sent over communications bus 146. The inputs and outputs to motor controller 106 are physically constructed in a similar manner to power supply 110, bed controller 108, and motor power infeed 152. In particular, motor controller 106 includes a male port 136 on one side and a female port 132 on an opposite side. These ports provide connections to communications bus 146, low voltage power line 144, and high voltage power line 134. Motor controller 106 includes an electrical power tap 184 that taps into high voltage power line 134 (FIG. 7). Power tap 184 supplies electrical power directly to one or more motors in motorized rollers 52a. Motor controller 106 does not otherwise utilize any of the electrical current in high voltage power line 134. Motor controller 106 further includes a power tap 186 that taps into low voltage power line 144. Power tap 186 both supplies power to motor controller 106 itself, as well as to an associated photosensor 96. Motor controller 106 also includes a communications tap 188. Communications tap 188 is operably coupled to communications bus 146. Communications tap 188 allows motor controller 106 to receive messages sent over communications bus 146, as well as to transmit messages over communications bus 146.

Motor controller 106 includes a cable 147 for communicating with photosensor 96, as well as cables 149 for controlling the motorized roller 52a. Motor controllers 106 may further include additional I/O ports (not shown) for controlling and/or monitoring such things as limit switches, pilot lights, solenoids, and conveyor brakes. Motor controllers 106 receive messages sent over communications bus 146 that are either addressed to a specific motor controller 106, or that are globally broadcast to all motor controllers 106 that are in communication with each other on a bus 146. The set up and installation of a conveyor system using conveyor beds 50 is simplified by the fact that bed controllers 108 and motor controllers 106 are configured to automatically assign communications addresses to each of the motor controllers 106 that are in communication with bed controller 108 via communications bus 146. This automatic self-addressing occurs regardless of the number of motor controllers 106 that may be in communication with bed controller 108 via bus 146. This automatic self-addressing eliminates the step of a technician or other personnel having to manually assign communications addresses to each of the motor controllers 106 and communicate this information to bed controller 108.

Bed controller 108 receives its power from low voltage power supply 110, which in turn is electrically coupled to lines L5–L6 and ground wire 14. High voltage power supplies 112 are electrically coupled to two of lines L1–L3 and ground wire L4. Power supply 112 delivers power to the motorized rollers through power infeeds 152 (not shown) and motor controllers 106. Power supplies 110 and 112 are coupled to different lines so that, in an emergency, power can be shut off to the motors in the conveyor system without shutting off power to the control elements, such as bed controller 108, photosensors 96, and motor controllers 106. By maintaining power to these control elements, the location of articles and the processing thereof, is not disturbed by an emergency stop. Stated alternatively, the knowledge of the position of articles is not lost when an emergency stop is instituted.

Figure 12:
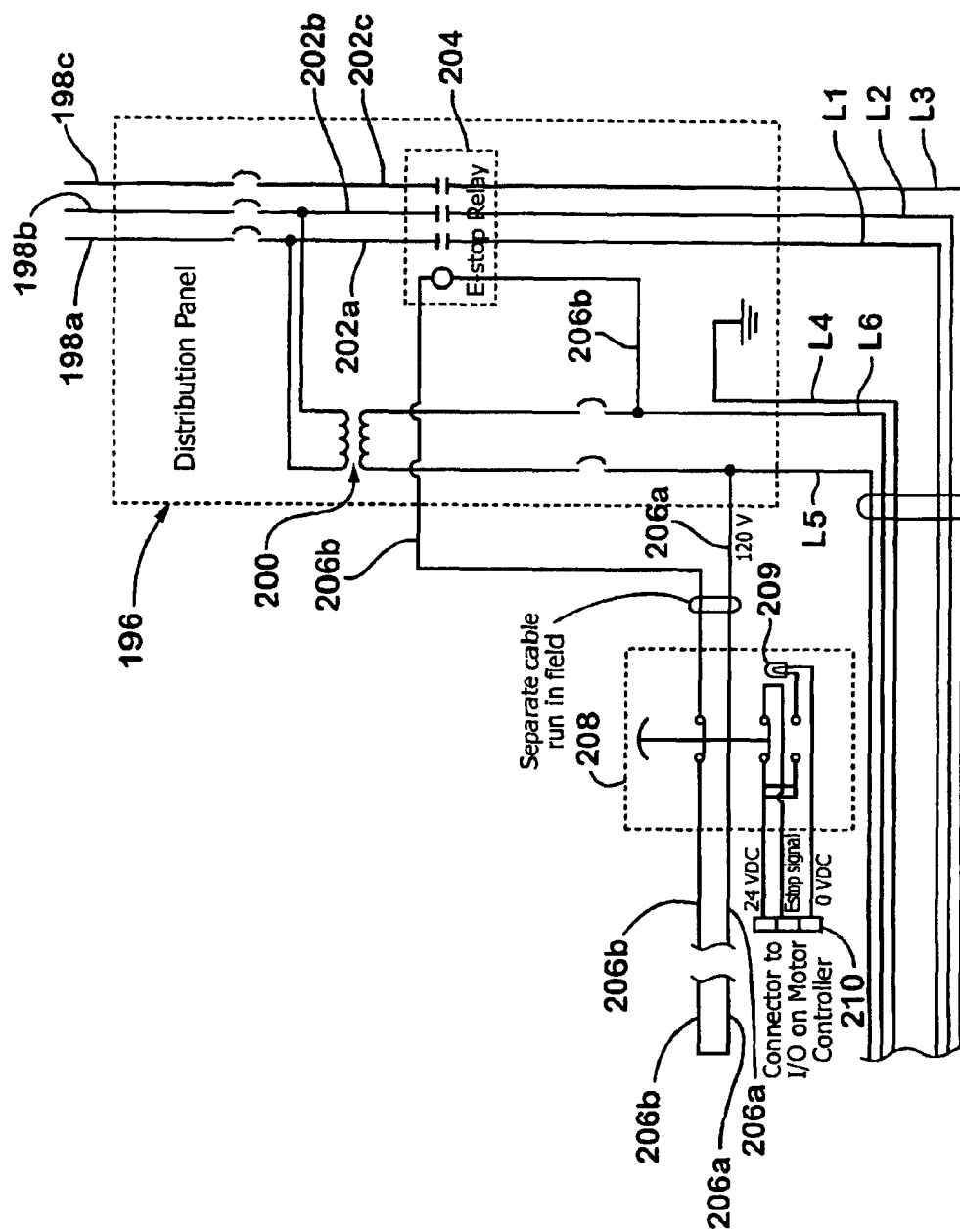
FIG. 12 is an electrical schematic of a portion of an emergency stop system.

FIG. 12 illustrates the electrical circuitry for carrying out an emergency stop according to one aspect of the present invention. A power distribution panel 196 is electrically coupled to the available power supply in a plant, factory, or other environment in which the conveying system is to be installed. Depending on the size of the conveying system to be installed, multiple power distribution panels 196 may be necessary to supply power to the complete conveying system 1. Power distribution panel 196 receives three-phase power over lines 198a, b, and c. Power distribution panel 196 may include a transformer 200 adapted to transform the power in lines 198 to a different voltage level. Three power lines 202a, b, and c exit transformer 200 and travel to a relay 204. Wires L1, L2, and L3 exit relay 204 and join AC wire harness 114 inside one or more of the side members 56 in the conveyor beds 50. Wires L1–L3 may extend through as many conveyor beds 50 as can be safely accommodated by a single distribution panel 196. Wires L5 and L6 of wire harness 114 branch off of wires 202a and 202b in power distribution panel 196. Wire L4 may be grounded at power distribution panel 196. Emergency stop wires 206a and 206b branch off of wires L5 and L6 and distribution panel 196. E-stop wires 206a and b travel to an emergency stop switch 208.

E-stop switch 208 may be positioned at any suitable location along a conveyor bed 50, or it may be positioned at locations removed from a conveyor bed 50. Typically, there will be multiple E-stops switches 208 that are electrically coupled to a given power distribution panel 196. E-stops switches 208 are positioned at any suitable location where it is desirable to have easy access to shutting down the movement of the conveyor system. E-stop wires 206a and 206b may be threaded through lower cavity 88 inside members 56 of conveyor beds 50. Wires 206a and 206b extend through each E-stop switch 208 until the last E-stop switch 208 in a chain of switches is reached. Alternatively, each E-stop switch could be separately wired back to power distribution panel 196 and interconnect there. At that terminal point, wires 206a and b are electrically coupled together. Thus, when no E-stop switch 208 has been depressed, current flows through wire 206b to thereby activate relay 204. The activation of relay 204 couples wires 202a–c with wires L1–L3, thereby delivering electrical power to wires L1, L2, and L3. When any single E-stop switch 208 is depressed, the electrical connection between wire 206b and E-stop relay 204 is interrupted. This deactivates relay 204, thereby terminating power to wires L1, L2, and L3. Because the motorized rollers 52a receive their power from high voltage power supplies 112, which in turn receive their power from wires L1, L2, and L3, the pressing of any E-stop switch 208 cuts off power to all of the motorized rollers that are powered by the associated power distribution panel 196. Each E-stop switch 208 may include a connector 210 that is adapted to matingly connect to corresponding ports on a motor controller 106. This connection allows an E-stop light 209 to be illuminated with electrical power from low voltage power line 144 when an E-stop is activated. As will be appreciated from FIG. 12, the pressing of an E-stop switch 208 does nothing to affect the electrical current in wires L5 and L6. Low voltage power supplies 110 in the associated conveyor beds 50 are therefore unaffected when an E-stop is initiated.

While the present invention has been described in terms of embodiments depicted in the drawings and discussed in the above specification, it will be understood by one skilled in the art that the present invention is not limited to these particular embodiments, but includes any and all such modifications that are within the spirit and scope of the present invention as defined in the appended claims.

What is claimed is:

1. A conveyor system comprising:
a conveyor frame supporting a conveying surface;
at least one motor at said frame, said motor configured to cause articles placed in at least one location on said conveying surface to be transported when said motor is energized;
a control circuit at said frame;
a first power source housed within said frame and in electrical communication with said at least one motor, said first power source supplying power to said at least one motor, and
a second power source housed within said frame and in electrical communication with said control circuit, said second power source supplying power to said control circuit, said second power source being electrically isolated from said first power source such that electrical current from said first power source can be shut off without shutting off electrical current from said second power source.

2. The conveyor system of claim 1 wherein said control circuit includes a motor controller adapted to control said motor, said motor controller receiving electrical power from said second power source.

3. The conveyor system of claim 2 wherein said control circuit includes a sensor that is adapted to detect an article on the conveyor, wherein said motor controller is adapted to control said motor in response to said sensor detecting an article.

4. The conveyor system of claim 2 wherein said control circuit further includes an upper-level controller in communication with said motor controller, said upper-level controller adapted to send commands to said motor controller to cause said motor controller to control said motor, said upper-level controller receiving power from said second power source.

5. The conveyor system of claim 4 wherein said conveyor includes a plurality of motors and a plurality of motor controllers, said upper-level controller in communication with said plurality of motor controllers and adapted to send commands to said plurality of motor controllers to cause said plurality of motor controllers to control said motors.

6. The conveyor system of claim 3 wherein said sensor is a photo-eye adapted to detect the presence of an article positioned on said conveyor.

7. The conveyor system of claim 1 wherein said first power source supplies electrical current at a first voltage and said second power source supplies electrical current at a second voltage, said second voltage being different from said first voltage.

8. The conveyor system of claim 1 further including at least one switch adapted to selectively stop electrical power from being delivered to said first power source.

9. The conveyor system of claim 8 wherein said at least one switch includes a button positioned adjacent said conveyor, said button able to be pushed by a person to stop electrical power from being delivered from said first power source.

10. The conveyor system of claim 1 further including a transformer in electrical communication with said first power source, said transformer causing said first power source to deliver power to said motor at a particular voltage.

11. The conveyor system of claim 10 wherein said first power source includes a rectifier that rectifies alternating current to direct current at a particular voltage before being supplied to said motor.

12. The conveyor system of claim 11 wherein said particular voltage is 48 volts.

13. The conveyor system of claim 11 further including a transformer in electrical communication with said second power source, said transformer causing said second power source to deliver power to said control circuit at another voltage that is different from said particular voltage.

14. The conveyor system of claim 1 wherein said first power source is supplied with electrical power from a first power line and said second power source is supplied with electrical power from a second power line.

15. The conveyor system of claim 14 wherein at least one end of each of said first and second power lines is adapted to be connected to an adjacent conveyor bed and to supply power to said adjacent conveyor bed.

16. The conveyor system of claim 14 wherein said first and second power lines run for substantially the entire length of said frame and are enclosed within a side channel defined in said frame.

17. The conveyor system of claim 14 wherein at least one of said first and second power lines is a three-phase power line.

18. The conveyor system of claim 17 wherein said at least one of said first and second power lines is an alternating current line having a voltage of at least 220 volts.

19. The conveyor system of claim 18 wherein said conveyor is adapted to supply electrical power having a voltage of at least 220 volts to an adjacent conveyor.

20. The conveyor system of claim 14 wherein said first power line comprises a first electrical cable and said second power line comprises a second electrical cable.

21. The conveyor system of claim 1 further including a conveyor belt in operational contact with said motor, said conveyor belt providing a conveying surface on which articles may be carried, said conveyor belt adapted to move articles carried on said conveying surface when said motor is activated.

22. The conveyor system of claim 1 further including a plurality of rollers supported by said frame, said rollers adapted to rotate and move articles carried on said rollers when said motor is activated.

23. The conveyor system of claim 1 wherein said conveyor includes a plurality of motors, a plurality of motor controllers, and a plurality of upper-level controllers, each of said motor controllers communicating with at least one upper-level controller over a first communications bus, and each of said upper-level controllers communicating with each other over a second communications bus, said second communications bus is different from said first communications bus.

24. A conveyor system comprising:
a conveyor frame supporting a conveying surface;
at least one motor at said frame, said motor configured to cause articles placed in at least one location on said conveying surface to be transported when said motor is energized;
a first power line housed within said frame;
a second power line housed within said frame;
a first power supply supported by said frame and in electrical communication with said first power line, said first power supply adapted to supply electrical current at a first voltage to said at least one motor;
a motor controller supported by said frame, said motor controller adapted to control said at least one motor;
a second power supply supported by said frame and in electrical communications with said second power cable, said second power supply adapted to supply electrical current at a second voltage level to said motor controller; and
a power interface positioned adjacent a first end of said frame, said power interface in electrical communication with said first and second power lines and adapted to allow power to be supplied to an adjacent conveyor.

25. The conveyor system of claim 24 wherein said power line supplies to said first power supply a peak-to-peak value of at least 200 volts.

26. The conveyor system of claim 24 wherein said first power line includes at least three wires carrying three-phase alternating current.

27. The conveyor system of claim 26 wherein said first power supply supplies at least 48 volts.

28. The conveyor system of claim 24 further including a power inlet adjacent a second end of said frame, said power inlet in electrical communication with said first and second power lines and adapted to allow electrical power to be supplied to said first and second power lines from an adjacent conveyor.

29. The conveyor system of claim 24 further including a least one switch adapted to selectively stop electrical power from being delivered to said first power supply.

* * * * *